United States Patent Office 3,473,062
Patented Oct. 14, 1969

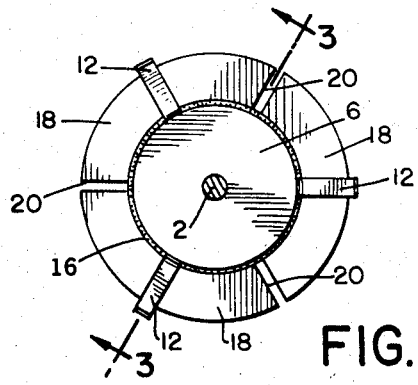
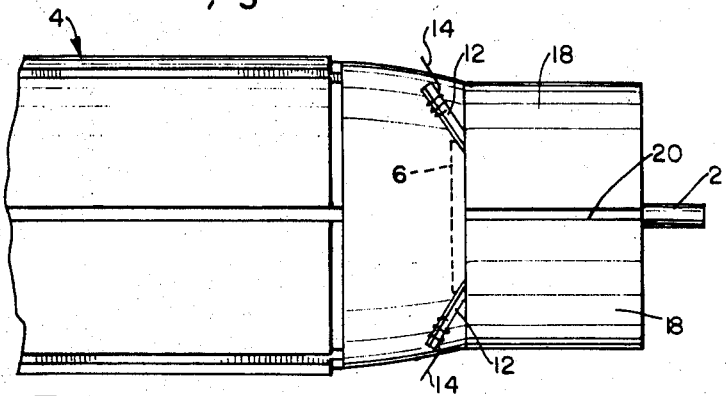
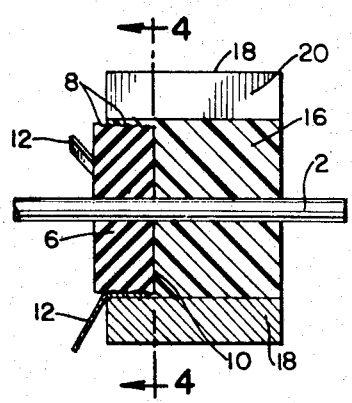
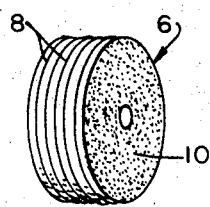

3,473,062
CARBON COMMUTATOR
Walter Förste, Suhl, Thuringia, and Gottfried Ostermay, Berlin, Germany, assignors to VVB Elektrogerate, Berlin, Germany
Filed Apr. 5, 1968, Ser. No. 719,070
Int. Cl. H01r 39/52, 39/16
U.S. Cl. 310—234    9 Claims

ABSTRACT OF THE DISCLOSURE

Carbon commutator for small electric motors, having an initially non-slotted carbon casing and a disk-shaped insulating member closing one end of the casing, the electrical connecting elements for the armature winding being clamped between the casing and the member. A preferably hardenable and electrically non-conductive resin compound is provided in the casing for securing the same to the member. After hardening of the compound, the casing is axially slotted so as to provide the required number of segments or lamellae as well as slots therebetween.

---

The invention relates to carbon commutators for establishing contact connections between the armature winding wires and the lamellae or segments of carbon commutators in small electric motors, such as are widely used in toys.

In designing carbon commutators, one must consider the contact problems which occur between the winding wires and the carbon segments, both in electrical and in mechanical terms.

Many attempts have been made in the past to solve this problem by designing carbon commutators so that the technical, techological and economic aspects would be properly harmonized. For instance, carbon commutators are known in which the segments are made individually and are provided with slots or boreholes.

Before or after assembly of the commutator, the wires are guided through these slots; after that, they are corrugated or coiled and they are then pulled back into the slots. In order to avoid tensions or wedging effects, the non-corrugated wires are attached with an electrically conductive and hardening paste or a kind of a putty.

It is furthermore known to use metal fabrics or foils in suitable recesses of the segments for the purpose of connecting the winding wires.

The disadvantage of these designs consists in the fact that several complicated, time-consuming and expensive operations are required to establish the electrical and mechanical connection between the wires and the segments or lamellae of the carbon commutator.

It is one of the main objects of this invention to reduce the time-consuming and expensive operations in the production of a commutator, considering favorable contact possibilities, by means of a novel and advantageous commutator structure and a new method therefor.

It is an object of the invention to create a carbon commutator with an equally efficient and durable combined electrical and mechanical connection between the winding wires and the segments.

The invention, according to its major features, solves the problem as follows: Along the inner surface of a cylindrical carbon casing, a number of metal-foil strips are disposed, identical in number to that of the segments, and these strips are distributed in axial symmetry around the circumference in the form of tabs, and they are inserted parallel to the axis. These strips are pressed against the carbon casing for purposes of establishing good electrical contact. A cylindrical insulating member is used for providing the contact. The length of this member is considerably shorter than that of the carbon casing; however its diameter corresponds to the inside diameter of the casing. The remaining space inside the casing is filled with an electrically non-conductive, hardenable resin in order to achieve stability in the commutator. The individual segments or lamellae are obtained as a result of the slotting of the casing in a radial direction, after the hardening process.

The insulating member is preferably provided with ring- or wave-shaped projections along its surface, for the adjustment of tolerances, both in the casing and in the insulating member, and it may have a roughened surface along the front wall facing toward the resin.

In assembly commutators according to this invention it is an advantage that the carbon casing can be attached to the insulating member, and the winding wires can be connected (directly of by way of the above-metioned tabs) to the casing, in a single operation.

Other important features of the invention will become apparent from the specification. Objects, attendant advantages and further details of the invention will be readily appreciated as the same becomes better understood by reference to the following detailed description, when considered with the accompanying drawings, wherein FIG. 1 is a view of a three-segment commutator made according to the present invention;

FIG. 2 is a side view of the commutator of FIG. 1, together with parts of the associated armature;

FIG. 3 is a longitudinal sectional view taken along line 3—3 of FIG. 1;

FIG. 4 is a transversal sectional view taken along line 4—4 of FIG. 3; and

FIG. 5 is a perspective view of the insulating member used in the inventive commutator.

As a matter of example, a three-segment commutator is shown and described although, it will be understood, the principles apply to other numbers of segments, slots therebetween and appropriate connecting wires for the armature windings. The latter will not be described or illustrated since it is well known to those skilled in the art.

Once the armature assembly has been assembled, it is pushed over and attached in the conventional manner on a shaft 2. No details being described, the armature is generally designated by numeral 4. It may of course be treated or immersed in lacquer in the usual manner. At the point of the shaft 2 where the commutator should be provided a disk-shaped, cylindrical insulating member 6 is attached, as best shown in FIG. 3. The face turned away from the armature 4 is preferably roughened, as shown in said figure; the outer envelope of the member 6 may preferably be given annular or wave-shaped projections 8, as shown in the perspective view of FIG. 5, also showing the roughened face 10.

A non-slotted carbon cylinder or casing is pushed over the insulating member 6, as shown in FIG. 3; its length substantially exceeds that of the member 6 and it has an inner diameter substantially corresponding to the outer diameter of the same. Numerals 18 and 20, to be described later in detail, apply to the carbon casing. The end thereof closer to the armature is thus closed by the member 6; during assembly, an appropriate number of metal-foil or other electrical connecting elements, such as for example the metal strips 12, are clamped between the casing and the member 6, again as shown in FIG. 3.

The armature windings may terminate in wires 14 which can be soldered or otherwise attached with their ends to the strips 12, as indicated in FIG. 2. It will be understood that the wires can also be clamped in without the strips being interposed (this alternative not being shown but self-explanatory).

The space inside the carbon cylinder or casing is filled up with an electrically non-conductive, preferably hardenable resin compound shown at 16; such a compound can be heat-treated and hardened, or otherwise solidified, so as to lend a certain degree of stability to the assembly comprising the casing and the insulating member.

Once the subassembly is hardened, the casing is longitudinally slotted, in a direction radially toward the shaft 2, whereby segments or lamellae 18 are obtained, interspersed with a corresponding number of slots 20, as shown in FIGS. 1, 2 and 4.

This construction has proven to be simple and efficient in production. Deviations of the measurements of the casing and the member are eliminated by the provision of the above-mentioned projections 8 on the outer surface of the member 6. The material of the latter is chosen to be resilient enough to allow a certain degree of press fit inside the carbon cylinder or casing, with only the thickness of the metal strips 12 or connecting wires 14 remaining therebetween, surrounding by a thin coat of the compound 16.

It will be understood from the preceding description that the commutator can be manufactured in a cheap and expeditious manner, without resorting to multiple steps and using complicated jigs and the like. The contact between the armature-winding wires, or connecting strips, and the segments of the casing are both mechanically and electrically ensured.

It is particularly advantageous that the attachment between he carbon casing and the insulating member, as well as that beween the connecting elements and the casing segments is accomplished in a single procedural step.

A similar invention is described in applicants' co-pending patent application Ser. No. 719,071, filed on the same day, and entitled "Carbon Commutators," declaring alternative features which, however, can be combined with those disclosed and claimed herein.

What we claim is:

1. A carbon commutator for small electric motors, the latter having an armature, windings thereon, electrical connecting elements for said windings, and a shaft for said armature; the commutator comprising a disk-shaped insulating member concentrically disposed about said shaft; a cylindrical carbon casing surrounding said member, extending therebeyond in a direction away from said armature, and having an inner diameter substantially corresponding to the outer diameter of said member; the latter closing the end of said casing which is closer to said armature; at least two of said connecting elements being clamped between said casing and said member; a corresponding number of slots being provided in said casing so as to form commutator contact segments therein; and means for securing said segments of the casing to said member.

2. The carbon commutator as defined in claim 1, wherein said casing has at least three symmetrically disposed slots and segments, there being a corresponding number of said connecting elements, one each clamped substantially midway between said slots.

3. The carbon commutator as defined in claim 1, wherein said insulating member is roughened on at least its face turned away from said armature.

4. The carbon commutator as defined in claim 1, wherein said connecting elements are metal strips leading at least partly to said windings.

5. The carbon commutator as defined in any one of claims 1 to 4, further comprising an electrically non-conductive compound in said casing and constituting said securing means.

6. The carbon commutators as defined in claim 5, wherein said compound is a hardenable resin.

7. The carbon commutator as defined in claim 1, wherein said insulating member is provided with projections on at least one of its surfaces.

8. The carbon commutator as defined in claim 7, wherein said projections are annular.

9. The carbon commutator as defined in claim 7, wherein said projections have undulating profiles.

References Cited

UNITED STATES PATENTS

| | | | |
|---|---|---|---|
| 1,270,967 | 7/1918 | Mizer | 310—233 |
| 1,793,986 | 2/1931 | Apple | 310—233 X |
| 1,811,180 | 6/1931 | Landers | 310—237 |
| 2,306,028 | 12/1942 | Conradty et al. | 310—236 |
| 3,014,144 | 12/1961 | Fleischmann et al. | 310—239 |
| 3,103,060 | 9/1963 | Fay | 310—235 X |

FOREIGN PATENTS 1,166,601   11/1958   France.

MILTON O. HIRSCHFIELD, Primary Examiner

D. F. DUGGAN, Assistant Examiner

U.S. Cl. X.R.

310—235